US010027679B2

(12) United States Patent
Rezlan et al.

(10) Patent No.: US 10,027,679 B2
(45) Date of Patent: *Jul. 17, 2018

(54) SECONDARY ASYNCHRONOUS BACKGROUND AUTHORIZATION (SABA)

(71) Applicant: IDECSI, Bagneux (FR)

(72) Inventors: Daniel Rezlan, Asnieres (FR); Jeremie Collonge, Bois-le-Roi (FR); Luc Dubrois, Montmorency (FR); Thibault Hue, Paris (FR)

(73) Assignee: IDECSI, Bagneux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,244

(22) Filed: Jun. 22, 2017

(65) Prior Publication Data

US 2018/0131702 A1   May 10, 2018

Related U.S. Application Data

(63) Continuation of application No. 13/600,757, filed on Aug. 31, 2012, now Pat. No. 9,723,013.

(60) Provisional application No. 61/663,182, filed on Jun. 22, 2012.

(51) Int. Cl.
*H04L 29/06* (2006.01)

(52) U.S. Cl.
CPC ........ *H04L 63/107* (2013.01); *H04L 63/1408* (2013.01)

(58) Field of Classification Search
CPC .............. H04L 63/107; H04L 63/1008; H04L 63/1433; H04L 63/20; G06F 11/00
See application file for complete search history.

(56) References Cited

U.S. PATENT DOCUMENTS

2008/0059474 A1 * 3/2008 Lim .................... G06F 17/3089
2013/0097709 A1 * 4/2013 Basavapatna ......... G06F 21/552
726/25

OTHER PUBLICATIONS

Fonseca et al., Online Detection of Malicious Data Access Using DBMS Auditing, 8 pages (Year: 2008).*

* cited by examiner

*Primary Examiner* — Hadi S Armouche
*Assistant Examiner* — Huan V Doan
(74) *Attorney, Agent, or Firm* — Whiteford, Taylor & Preston, LLP; Peter J. Davis

(57) ABSTRACT

A system for identify threats to the security of an owner's electronic information by performing a secondary background authorization (SABA) that is transparent to the requester to verify or flag unauthorized access to systems, data or company offices being requested. The secondary background authorization relies on a proprietary security, big data pattern-matching, and modeling approach made possible by the creation, expansion, and analysis of new "data streams" that, together with Operating systems, applications, and devices data, uniquely allows the system to determine a security access risk and provide information to the owner.

5 Claims, 10 Drawing Sheets

SECONDARY ASYNCHRONOUS BACKGROUND AUTHORIZATION (SABA)

FIELD OF THE INVENTION

The present invention relates to systems and methods (SABA solution) that monitor the confidentiality of an owner's IT resources, such as emails, access to his computer, access to his files, and data leak issues. The system generates alerts to the owner every time confidentiality is compromised. This system applies complex analysis and extrapolation rules to data collected from many sources combined with geo-location retrieved from electronic devices.

BACKGROUND OF THE INVENTION

It is known in the art of security that every individual resource (i.e. mailboxes, devices, and sensitive data) can be accessed easily in any type of IT architecture (i.e. Self-hosted, SaaS, Cloud) and IT organization.

Popular techniques in the art for protecting access to data include the following steps:

1. Use of a login and password combination to authenticate and retrieve credentials that allow access to the resources; and
2. Use of a personal certificate to access encrypted communications or storage.

The techniques just described suffer from the drawback that in any IT organization resources are:

- accessed by the owner,
- managed by system administrators,
- accessed by "trusted" people (delegate) defined by the owner and/or the system administrator,
- saved on disk or tape by the system administrator,
- protected by login/password security systems that can easily be hacked,
- can easily forward emails and data to especially untrustworthy people.

These features are related to the services that must be provided by the IT organization in order to deliver (i) business continuity, (ii) data backup, and (iii) mailbox repair. For example, administrators, by their function, must have full rights over the systems in order to be able to take any appropriate actions needed by the business or the users. Moreover, administrators have the ability to remove all traces of their actions.

To address this issue, the present invention has been designed to protect people and/or companies from unwanted access to mailboxes, sensitive data and resources. To provide this service, the present invention uses a Secondary Asynchronous Background Authentication (SABA) that is totally transparent and can alert the owner of the compromised information.

SUMMARY OF THE INVENTION

One object of the present invention is to provide a system, based on different in house developed systems/software, that applies in the area of data security to identify threats in real-time, including but not limited to identity theft, inappropriate communication to competitors, unauthorized data access, and unauthorized physical access, and provide alerts via email, SMS, and Phone calls to the owner of the information. The system performs a secondary background authorization that is transparent to the requester to verify or flag unauthorized access to systems, data or company offices being requested. The secondary background authorization relies on a proprietary security, big data pattern-matching, and modeling approach made possible by the creation, expansion, and analysis of new "data streams" that, together with Operating systems, applications, and devices data, uniquely allows the system to determine a security access risk and provide information to the concerned user.

According to one aspect of the present invention, there is provided a module with real time agents for creating, collecting, and storing Owner Authorization profiles for all owners and delegates. A delegate can be any person the owner identifies to the system as permitted to access owner's information.

According to another aspect of the present invention, an owner is the person who owns the information, e.g., data, document, email, voicemail, etc. The SABA system protects owner's information.

According to another aspect of the present invention, a delegate is a person who has authorized access to the owner's information. For example, a secretary might have access to the CEO's mailbox, at the discretion of the CEO. The secretary is a delegate of the CEO. This distinction avoids sending an alert to the owner each time his secretary reads his email.

According to another aspect of the present invention, a module is provided with real time agents for retrieving the theoretical identity of the user who accesses to resources of the owner ("the requester"). These agents also collect all available profile information regarding the requester at the time of the request.

According to another aspect of the present invention, a requester is a person who attempts to access an owner's information. The SABA system analyzes the requester's identity to define if he is an owner or a delegate. If neither, the SABA system sends alerts to a designated person who can be the owner or a designated person (i.e. Security Manager).

According to another aspect of the present invention, a designated person or designated user is a person who is designated to manage the SABA system for the custom company or to receive alerts.

According to the SABA system of the invention, users include owners, delegates and requesters. In a company information system, a user can be any employee, or any non-employee who accesses or attempts to access information stored on the system.

According to another aspect of the invention, an Authorized Personnel is a person who has access to company information system resources independently of SABA system. Authorized Personnel are often system administrators.

According to another aspect of the invention, a monitored user is any user that attempts to access protected information. A requester automatically becomes a monitored user at the time the requester seeks to access protected information. According to the preferred embodiment of the invention, the system determines whether a requester/monitored user is an owner, a delegate or an unauthorized user.

According to another aspect of the present invention, real time requester geo-location agents are provided.

According to another aspect of the present invention, real time owner or delegate geo-location agents are provided.

According to another aspect of the present invention, complex Rules and Programs for analyzing and comparing extrapolated data (profiles and geo-location) of requester, owner or delegate are provided. These programs identify fraud attempts.

According to another aspect of the present invention, an alerting system is provided that sends alerts using any communication services such as email clients, SMS, and smartphone to inform the owner of a breach of confidentiality. A dedicated web-based security interface is also available for reports and history management.

According to another aspect of the present invention, a configuration, administration and display of website information website is provided.

According to another aspect of the present invention, the system may optionally provide mechanisms to block access to resources in questionable situations with a method for the user to authenticate their identity in order to proceed.

DESCRIPTION OF THE DRAWINGS

The subsequent description of the preferred embodiments of the present invention refers to the attached drawings, wherein.

DETAILED DESCRIPTION OF THE INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
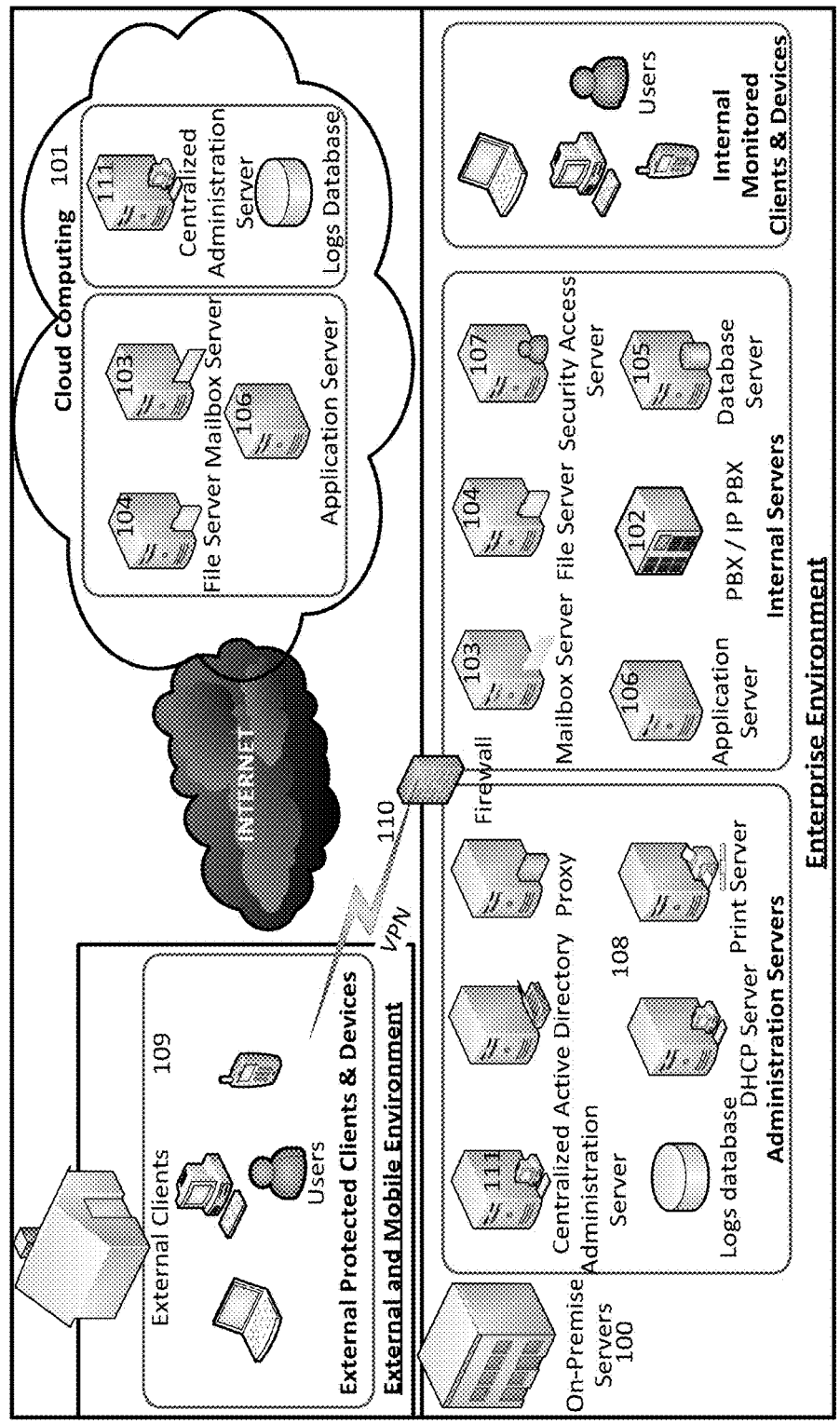
FIG. 1 describes typical user's environments in enterprise systems or cloud services.

FIG. 1 is an example of the architecture of a typical IT environment, which includes both Hardware (i.e. servers, PCs, storage, network equipment, security equipment, etc.) and Software (i.e. operating systems, messaging, users applications, etc.).

Many companies host this kind of system on premises (100), but with the expansion of internet and the cloud computing (101) they are beginning to outsource their resources and their data. Usually in a company there are servers for the messaging system, a call processing system, file servers, application servers, database servers, administration servers.

There are typically two kinds of PBX (102) servers, traditional and IP. Call processing software is typically installed on that server and is used to handle all outgoing or incoming calls for the company.

Messaging software will usually be installed on mail server (103) for handling the users' mailboxes, as well as sending and receiving users' mail.

Different types of file server (104) are available. A traditional standalone server, or cluster with storage attached can handle this functionality. Typically this is what a NAS will do. Users will store documents on the file server for access/use by that user and for sharing with other users.

A relational database management system such as Microsoft SQL Server, Oracle, Mysql, postgress will be installed on database server (105). It will usually be connected to a storage system and will be used to store and manipulate a large quantity of data.

Application server (106) may be installed as a user oriented application that can be used for accounting, Human resources, Business Intelligence, Sales, etc.

Security Access server (107) may be used to control authorized access to the different locations in the enterprise. For example, to go to the financial archiving room, a user will have to use a badge that is programmed by this system, and when he accesses this room the system logs it.

Administration servers (108) may be used to manage the other systems as well as the users or the company resources. Management system software will be installed on that server allowing the administrator to manage all of the resources from a centralized point.

All of a company's servers may be linked by and accessed through a network. Most of the time, the network will also allow external connections so that users can access external resources on the internet or access the company resources from the internet. The network is based on network equipment such as routers or switches. To be able to route the information to the right destination, the network equipment will use TCP/IP.

Based on the type of the communication used by the users, other protocols will be used (i.e. SMTP, HTTP, FTP, SNMP). Such protocols have the option of being secured. When these protocols are secured they take an "s" (ex: HTTPs).

This network also allow company's users to exchange data and information with external people from other companies using mail systems or other systems such as file transfer servers.

The servers by themselves may be attached to storage systems either directly attached to the server (SCSI) or via the network (SAN, NAS). These storage systems allow for a huge volume of data to be stored.

Systems are now also accessed via mobile devices (109) such as smartphones, tablets, and laptops. These devices can either be provided by the company or by the user himself. These devices are frequently used to send/receive mail or transfer data. They can also be used to access company resources. It has now become possible for a user to work from any location as if he was in his office.

To protect data from outside, or to control what users can do with the data, companies have implemented security systems like Firewalls, proxy servers, and secure VPNs (110).

It has become easier for users, due to the technology, to exchange information with people inside or outside the company. It has also become easier for users to store a lot of data on their personal devices.

At the same time it has become more difficult to manage all the resources of the information system. For that reason, centralized servers for administration have been implemented. These servers are managed by specialized people who handle tasks like user management, hardware management, network management, resources allocation, and rights management.

Because of that complexity and that power over the systems, company resources log tracking systems (111) have been implemented. Today all actions taken on a system, such as creating a new user, right assignment, creation or suppression of data, access to the information, or system configuration modification, are logged into log tracking systems.

It will be more difficult for the company to keep control on its data when the information system of the company is hosted outside the company within a SaaS company or in the cloud. It will then become critical for the company that all of the actions taken on data or on systems are tracked.

Figure 2:
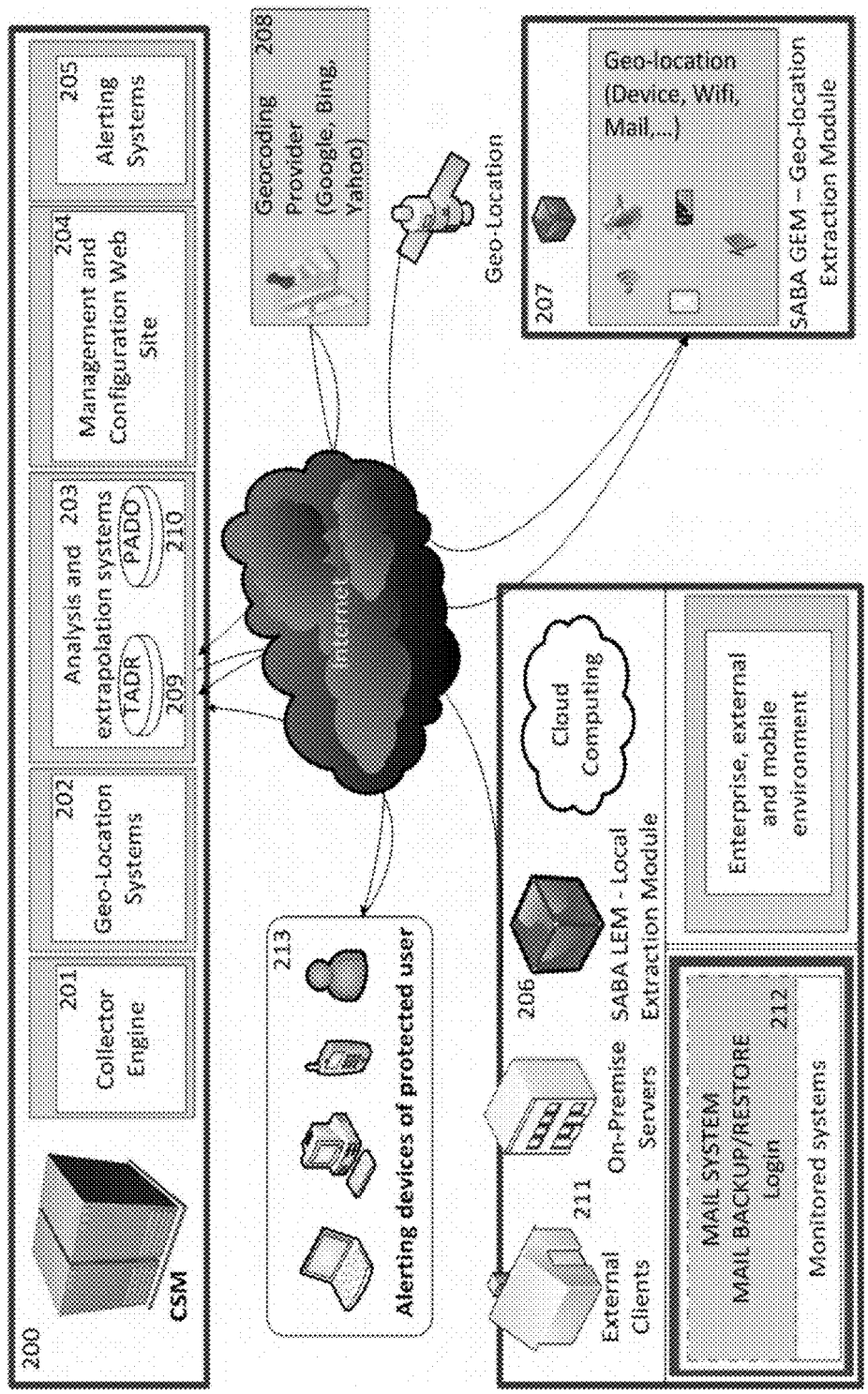
FIG. 2 describes typical user's environments in enterprise systems or cloud services with SABA system.

The Architecture of an IT environment with a SABA System according to the present invention, as seen in FIG. 2, shows a SABA System global implementation.

The SABA system of the present invention is an integrated solution based on different modules:

1. The Central System Management (CSM) (200) which is the core of the system. The CSM (200) preferably includes but is not restricted to,
   a. Collector Engine (CE) (201): This system preferably collects and analyzes technical data sent by the LEM (206) and the GEM (207) before transferring it to the AES (203) using PADO collector, TADR Retriever or Geo-location Collector.
   b. Geo-location Systems (GS) (202): This system preferably geocodes the resources of monitored users (requesters, owners and delegates) through dedicated databases and Geocoding providers (208).
   c. Analysis and Extrapolation Systems (AES) (203): This systems preferably stores and analyzes collected data from requester, owner, and delegate resources and systems,
   d. Management and Configuration Web Site (MCWS) (204): This system preferably allows for the configuration of SABA system and display of data for monitored users.
   e. The Alerting Systems (AS) (205): This system preferably sends alerts to monitored users after being processed by Analysis and Extrapolation systems.
2. SABA Local Extraction Module (LEM) (206): This module may be hardware, software, or a combination of both. A hardware device may include a system processor, some volatile memory like RAM, and a local storage system such as a hard drive to temporarily store collected data. The software of the SABA LEM may include an operating system software as well as SABA specific software. The SABA LEM (206) collects data from various systems and resources. Data collected are logs including information related to the monitored user as well as information provided by agents connected to monitored resources. Those logs are collected from Mail servers, File servers, Network equipment, Security equipment, PBX/IP PBX, Administration servers, etc, (212). The collected data are sent by the agents connected to the monitored systems to the Collector Engine (201).
3. SABA Geo-location Extraction Module (GEM) (207): This includes Software for tracking Geo-location related data from monitored user's devices and sending them to the Geo-location System (202) through the Geo-location Collector.

The SABA system relies on two main data sets. The Theoretical Authentication Data Request (TADR) (209), stores all unverified data from a requester, and the Personal Authentication Data of Owner (PADO) (210), stores all certified data from owners. Optionally, the PADO also stores all certified data from delegates.

When SABA is installed, a background check will be performed to verify that the requester of a monitored resource is really who he claims to be.

Every action carried out by a requester on a Monitored Resource, from the inside or from an external and/or a mobile environment (211), is sent to the AES (203) through the Collector Engine (201) using the SABA LEM (206). This information is defined as TADR (209).

Every action carried out by an owner (and, optionally, delegates) on a monitored resource, from the inside or from an external and/or a mobile environment (211), is sent to the Analysis and Extrapolation Systems (203) through the Collector Engine (201) using the SABA LEM (Local Extraction Module) (206) and the Geo-location Systems (202) which includes the SABA GEM (Geo-location Extraction Module) (207). This information is defined as PADO (Personal Authentication Data of Owner) (210).

The AES (Analysis and extrapolation systems) (203) will compare TADR (209) with PADO (210) to define if the action was initiated by an owner or a delegate, or by a thief. To make this determination, the AES (203) applies a set of rules using real time information or pre-calculated information specific to each monitored user.

If the result of the match does not validate the TADR (209), an alert is sent to one or more devices of the owner or delegate (213) using the Alerting Systems (AS) (205).

When receiving the alert, the owner will have to connect to the SABA system to confirm if the alert was legitimate or not. This will allow for the PADO to refine the authorized/monitored users' information and its usage.

Figure 3:
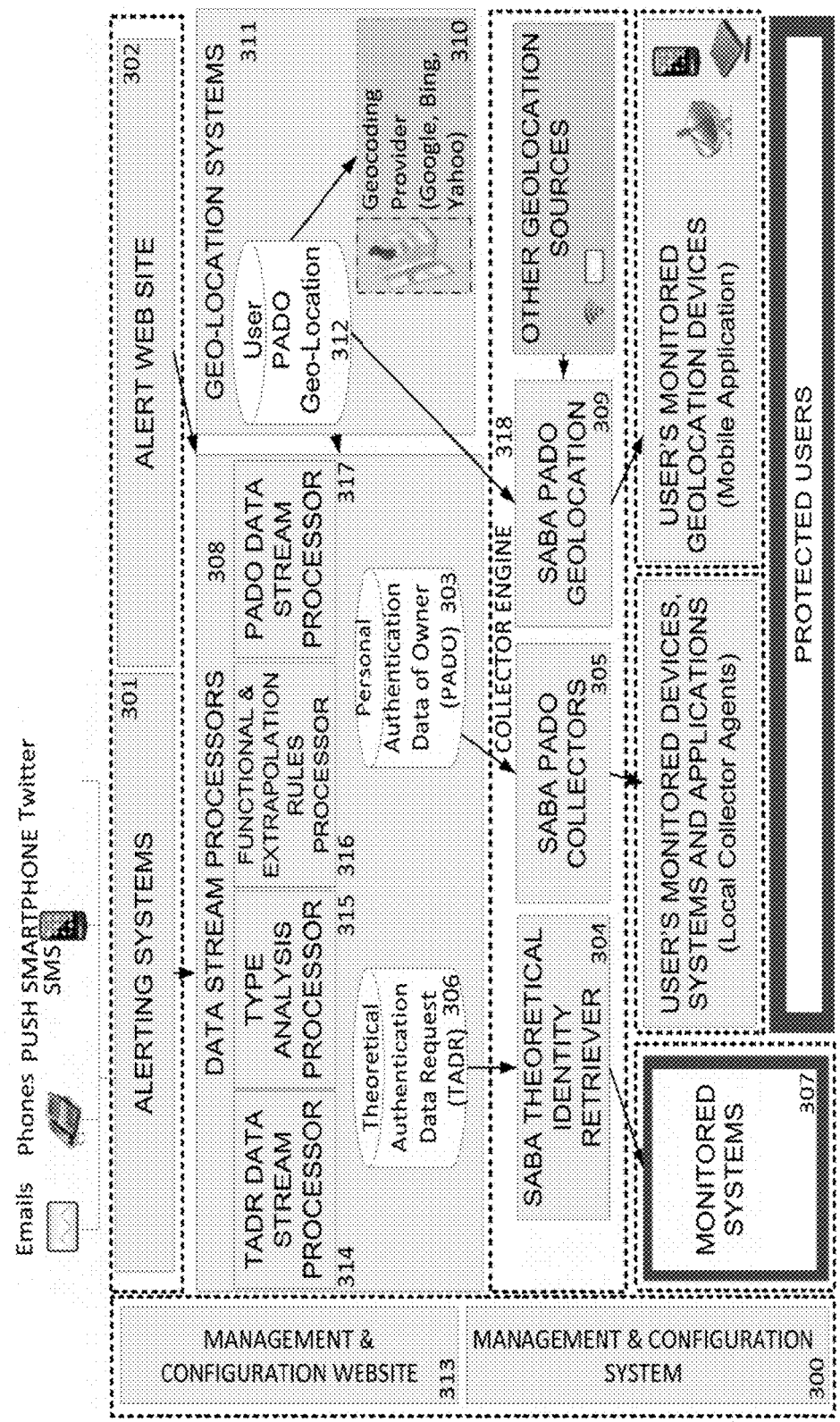
FIG. 3 describes the general architecture of a Secondary Asynchronous Background Authenticate ("SABA") system.

The Second Asynchronous Background Authentication System shows how an embodiment of FIG. 3 as the SABA system may be managed, configured, and fed using the SABA Management & Configuration System, the Alerting System and the Alert Web Site.

SABA Management and Configuration System (300) allows for the configuration of Collector engine (318) (including Identity Retriever (304), PADO Collectors (305) and PADO Geo-location (309)), SABA DataStream Processors (308) and Alerting Systems (301).

Alerting System (301) sends alerts to the monitored users. This system will also validate information from the TADR to be transferred to the user's PADO once the information has been certified by the owner.

Alert Web Site (302) is for viewing archived alerts and to acknowledge new alerts.

SABA Management and Configuration website (313) and System (300) allow SABA administrators to manage (create, modify, suppress, display) owners, and delegates and Protected Systems. These modules configure and store information regarding owners and delegates (username, first name, last name, mail address, devices ID, personal and office addresses, etc,), systems (URI hostname, ports, domain, etc.) and alert rules (owner's and delegates' working hours, access type, etc.) in order for SABA system to know what resources have to be protected and which owners and delegates have to be monitored.

A personal and unique PADO associated to an owner is also created. This PADO receives two main types of information: owner activity information and owner Geo-location information. These two types of information will allow the SABA System to certify the Owner Identity.

The SABA system will start to record all information retrieved from owner's actions in his PADO, using SABA PADO Collector (305) to analyze and to sort every technical data issued from agents installed on the owner's and delegates monitored devices, systems and applications.

A user always accesses or makes an action on a Protected System using an ID (Login, Badge, etc.). SABA System considers this user as a requester ("requester") with a theoretical identity that has to be validated as described below.

Using configuration data, SABA system monitors Protected Systems (307) through Theoretical Identity Retriever (TIR) (304) that collects log information sent by LEM and transfers this information to Data Stream Processors (DSP) (308) for treatments.

DSP (308) stores this information in a temporary database, identifies the information type with Type Analysis Processor (315) and publishes to TADR Data Stream Processors (314), which have previously subscribed to this information type, that a new event is available. TADR Data Stream Processors (314) request the temporary database to retrieve the requester's identity and all information available about the requester, feed the TADR data store (306), and launch the Functional and Extrapolation Rules Processor (316) for treatments.

Type Analysis Processors (315), depending on the type of information, provide a TADR data set to Functional & Extrapolation Rules Processors (316) that execute different rules to compare TADR data set to:
  (i) the monitored user profile, stored in the PADO data store (303),
  (ii) the Personal Authentication Data for Owner geolocation (312), retrieved from PADO geo-location (309). This data has been previously geocoded using geocoding providers (310) including but not limited to Google, Bing, and Yahoo.

If the data is not validated by the SABA DSP, an alert will be sent to the owner or a Designated Person using the Alerting System (301). The owner will then need to confirm if he or a delegate was the one doing the action on the Protected System. If the SABA System receives the confirmation via the Alerting System or the Alerting Web Site that the action has been taken by the owner, it will then feed the PADO with the new information.

Figure 4:
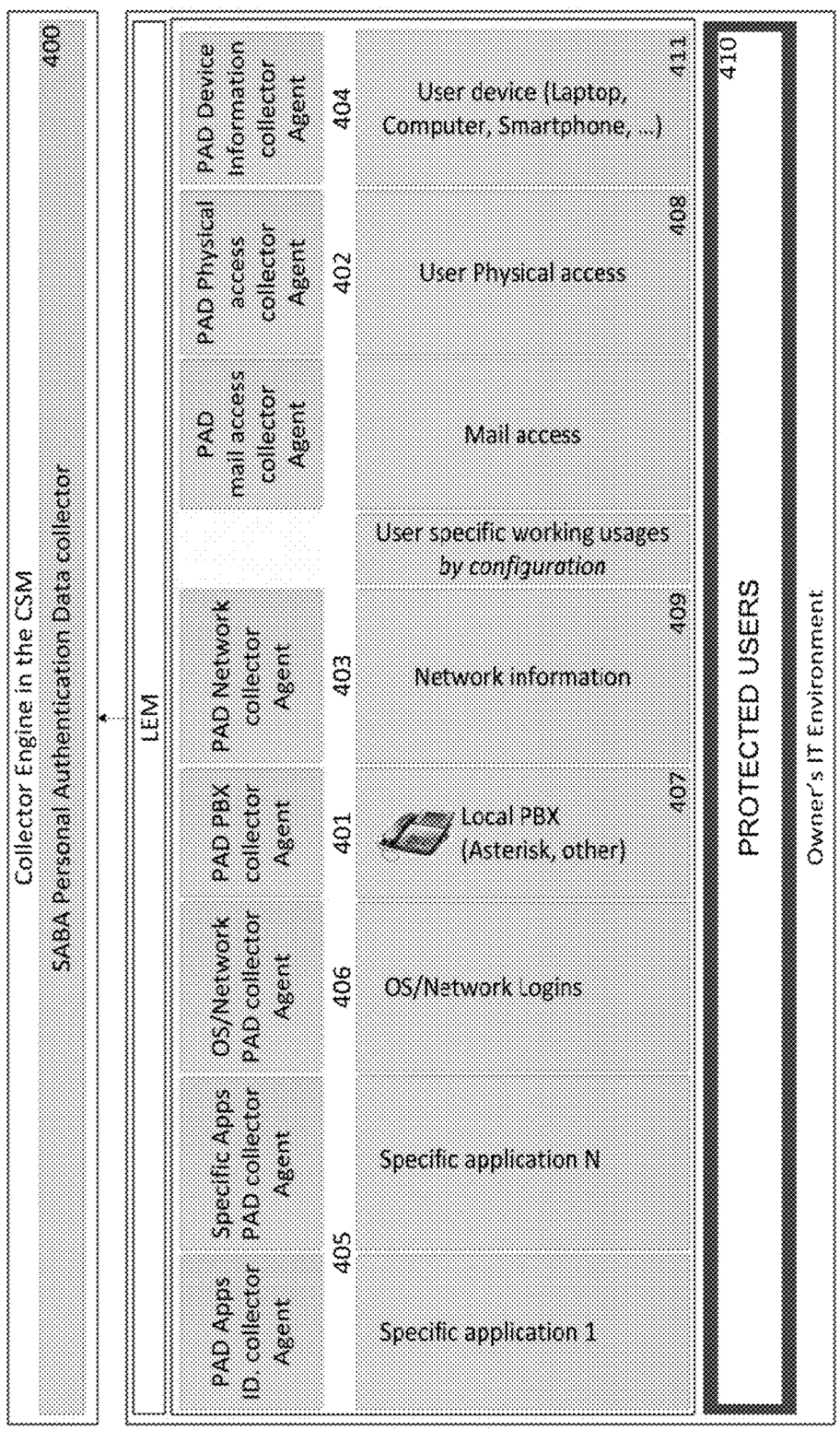
FIG. 4 describes PADO collector systems.

The different Personal Authentication Data of Owner (PADO) Collector Agents are described in FIG. 4.

By knowing, for example:
  what is the hardware used by an owner,
  what type of operating system is installed on it,
  what kinds of software applications are usually used by an owner,
  on what kind of network is that hardware connected,
  where is that network located,
  where is the owner located,
  what is the owner doing, SABA system could retrieve information regarding the owner and store this information in owner's PADO. To collect this information, SABA system provides SABA PADO Collectors (400) that receive and sort technical data sent by a set of PADO Agents (programs that retrieve information about actions and connections of an identified owner from different sources) installed on monitored user devices, applications, including Protected Systems, and systems that are relevant.

Each Agent sends monitored user activities to SABA LEM that transfers it to the PADO Collectors or directly to the PADO Collectors depending of the location of the device.

Agents include, but are not restricted to, PBX Agent (401), physical access Agent (402), network information Agent (403), device information Agent (404), software application information Agent (405), and credentials Agents (406). Agents capture information or collect it from data directly available from systems or logs.

PBX Agent retrieves incoming or outgoing calls from PBX/IP PBX (407) to validate user's physical presence in his office. It is the same with Physical Access Agent getting a card/badge information (408).

Network information Agent (403) defines device identification and location.

Owner device information Agent (404) retrieves information such as what type of hardware is being used, what kind of operating system is installed, what applications are usually used. This Agent is installed on monitored user devices (411).

Owner apps Agent (405) retrieves information like which applications are usually used. This Agent is installed on monitored user devices (411).

All information collected will be transferred to the SABA LEM and then to the PADO Collector or directly to the PADO Collector. From there, this information will be analyzed and sorted to define what technical data corresponds to validated owner actions. Then, information is transferred to the PADO DataStream Processor and stored in the PADO Data Store. All the information collected will be used in order to build the user profile.

Information collected about application used, calls, etc. will help define the monitored user's behavior (e.g: The user arrives every morning at 10 AM, he always logs in and then starts the corporate mail software. He makes a call before starting his web browser. The web browser used is always IE v9.)

Figure 5:
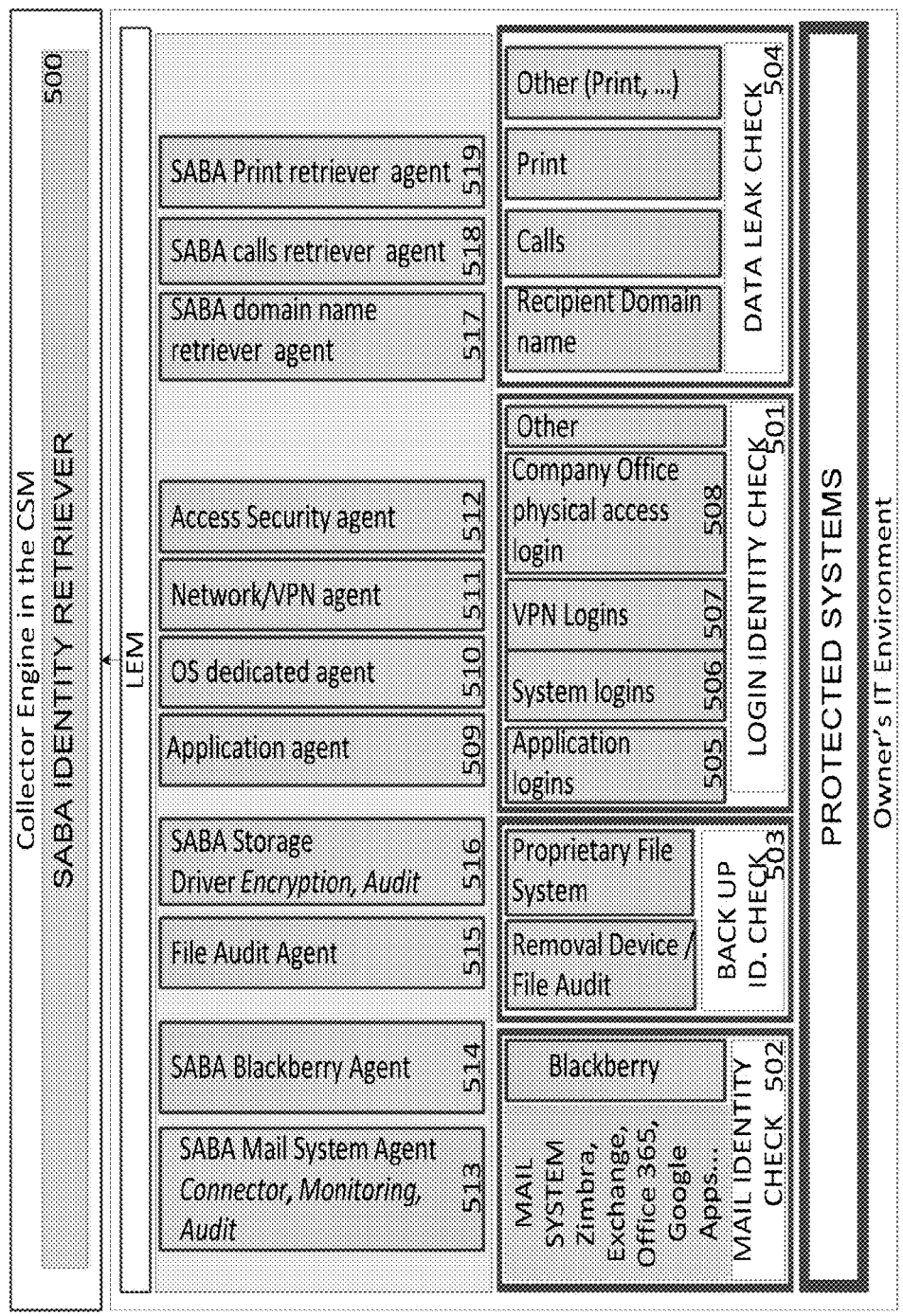
FIG. 5 describes a SABA Identity retriever.

FIG. 5 illustrates an embodiment of the Theoretical Requester Identity Retriever Collector Agents.

SABA Theoretical Identity Retrievers (TIR) (500) receive and sort technical data sent by a set of TIR Agents (programs that retrieve information about new connections, or actions realized on protected systems that have to be validated, from different sources) installed on all Protected Systems. Once collected by the SABA LEM, this information will be transferred to the SABA Theoretical Identity Retriever in the Collector Engine. When received by the SABA TIR, the information will be analyzed and filtered to identify a new connection or new action on the protected systems, and will then send the information to the SABA TADR Data Stream Processor that will store it in the Theoretical Authentication Data Request (TADR). The SABA TIRA are developed in house to insure that the information is surely and safely retrieved from the systems. The SABA TIRA are automatically activated as soon as a Protected System, data, or device is accessed.

Protected Systems are systems or data declared as sensitive by owners in SABA System, using SABA Configuration and Management Web Site. They can include Mailbox systems, critical applications, Backup systems and Data Leak issues. They are divided into 4 main categories:
  Login Identity Check (501),
  Mail Identity Check (502),
  Backup ID Check (503),
  Data Leak Check (504).

The login Identity Check (501) is based on a set of SABA TIRA. The role of these agents is to retrieve the Requester ID from all kind of software or hardware requesting an identification, such as applications (505), operating systems (506), Network Access (VPN) (507), access control software (508), security software and to provide all associated data.

SABA TIRA can be installed on servers, PCs, mobile devices, appliances, network equipment.

For login Identity Check (501), there is a specific agent for each type of systems accessed with specific credentials:
Application dedicated agent (509)
OS dedicated agent (510)
Network/VPN dedicated agent (511)
Access Security dedicated agent (512)

The Mail Identity Check (502) is based on 2 types of SABA TIRA agents that will monitor any action taken on a monitored mailbox. SABA TIRA will be installed on mail systems and retrieve access information, rights audit and type of actions done on the mailbox of the owner. These two Mail Identity Check agents are:
SABA Mail System agent (513)
SABA Blackberry Agent (514)

The Backup ID Check (503) is based on two SABA TIRA that will:
create a secure file system for backup data, and
track all file modification.

The backup files or data will then be "flagged" and can only be restored within a Protected System. These agents are:
SABA dedicated Storage (516)
File Audit dedicated Agent (515)

The Data Leak Check (504) is based on SABA TIRA. These agents collect data from mail systems, PBX/IP PBX, print servers, etc. Once the data is collected, it will be sent to the SABA TIR through the SABA LEM and then transferred to the AES to be matched against a list of key words. The words, phone numbers, contact addresses (emails) are defined by the owner, for example competitors, secret projects, head hunters, etc.

These agents are:
The SABA domain name retriever agent (517), used to log the recipient of all outgoing numeric communications like instant messaging, mails, etc.
The SABA calls retriever agent (518), used to retrieve information from logs of PBX/IPBX and collect all number of outgoing/ingoing calls and associated contacts.
The SABA Print retriever agent (519), used to get the name of the printed documents.

Figure 6:
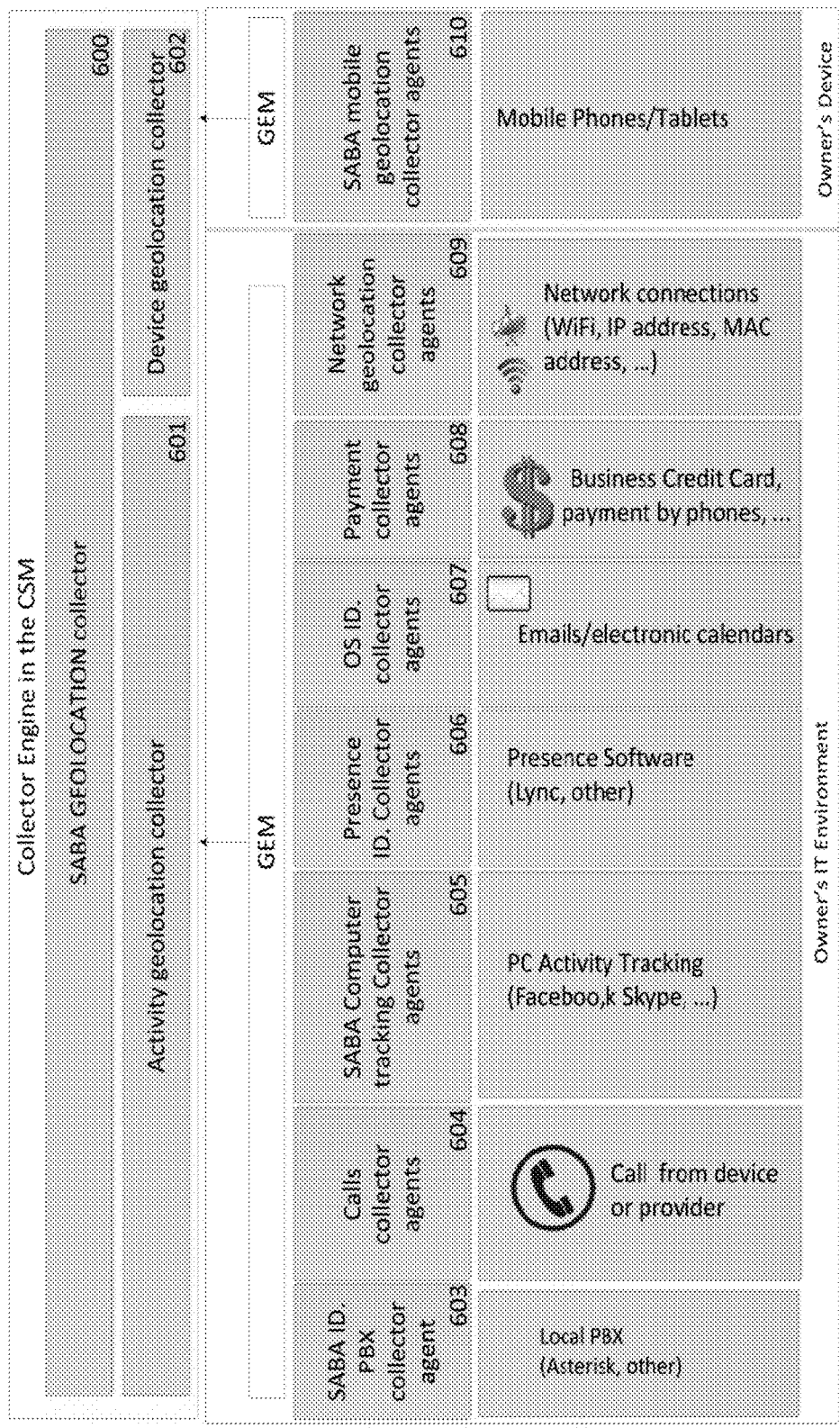
FIG. 6 describes SABA Geo-location modules.

Geo-Location Collector Agents are described in FIG. 6.

SABA Geo-Location Collector Agents (GCA) (600) are installed on owner's and delegates' mobile devices or resources. Depending on the agent type, the collected information will be sent to the SABA GEM that will transfer them to the SABA Activity Geo-location Collector or directly to the SABA Geo-location System located in the SABA AES. When received by the SABA AES, that information will be stored in the Personal Authentication Data for Owner (PADO) by the SABA PADO Data Stream processors. SABA Geo-Location Collector Agents (GCA) are developed in house to insure that the information is surely and safely retrieved from the systems. The SABA GCA is permanently activated.

The SABA Geo-Location Collector (600) is divided in two types of Collectors:
Activity Geo-Location (601)
Device Geo-Location (602)

Activity Geo-Location Collector (601) retrieve, from different collector agents, geo-location related information from all related events generated by user's activity and correlate with data already stored in PADO. All the agent collectors send technical data to the GEM that transfers it to the Activity Geo-location Collector in the Collector Engine. For example, from PBX collector agent (603), the system can deduce if the monitored user is using his phone in his office; from Computer tracking Collector Agent (605), the system can know that the monitored user is in his office using his computer and retrieve his position; from Presence Collector Agent (606), the system immediately get the status of his location; from calendar collector agent (607), the system can know his agenda and location; from Payment Collector Agents (608), the system know the place where the transaction is made and deduce monitored user position.

Figure 7:
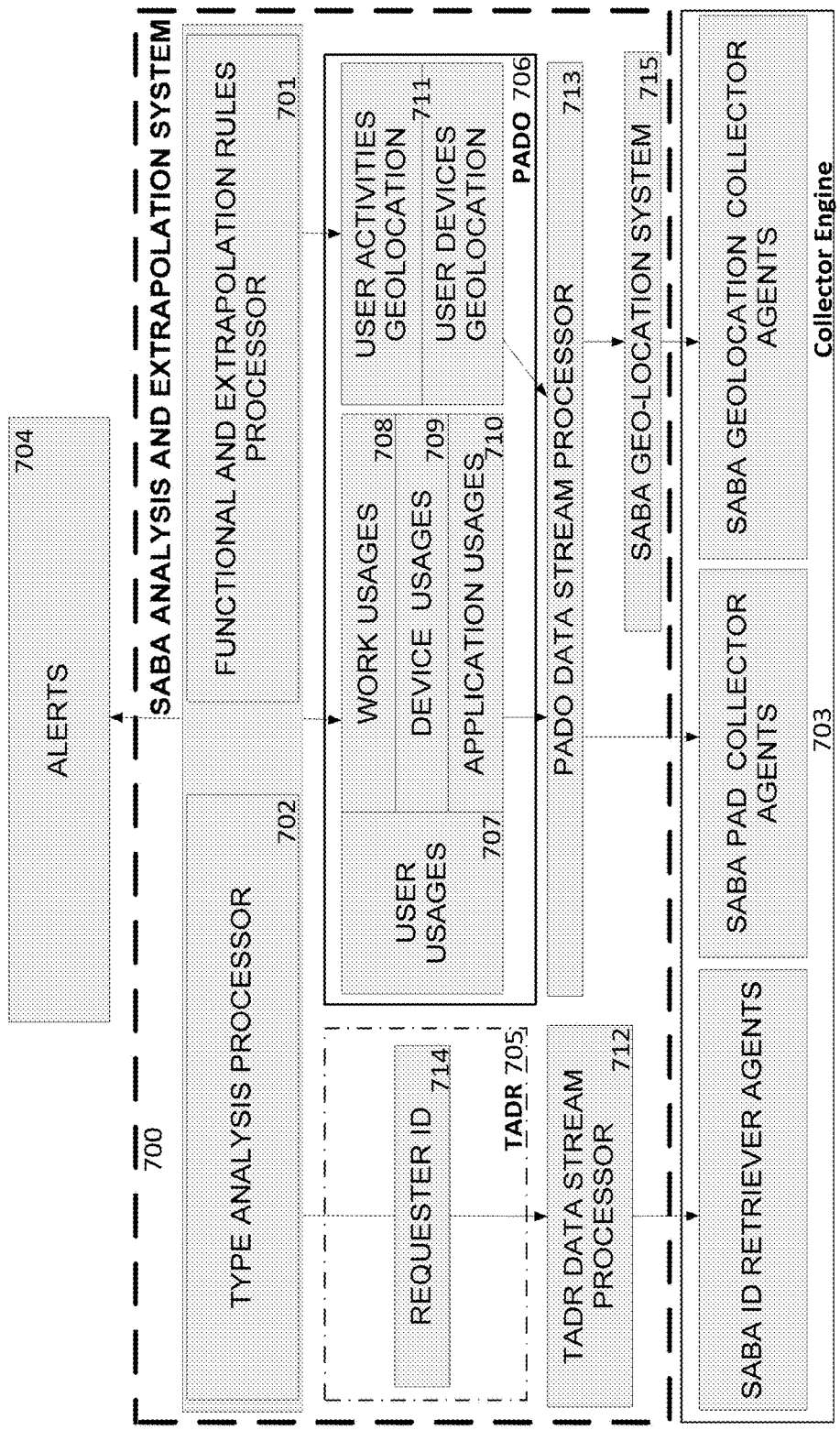
FIG. 7 describes SABA Analysis and Extrapolation System.

Device Geo-Location Collectors (602) retrieve, from different collector agents, geo-location related information from owner's and delegates' mobile device or Network elements positions. Device Geo-Location Collector (602) receives technical data from two types of agents:
Mobile Geo-Location Collector Agent (610) installed on owner's and delegates' device, which gets precisely the geographical position from GPS or GSM triangulation. Information collected by this agent is sent to the Geo-location Extractor Module (GEM) and transferred to the Device Geo-Location Collector;
Network Geo-Location Collector Agent (609), which gets IP Address or WIFI Spot used by owner and delegate. Information collected by this agent is sent to the Geo-location Extractor Module (GEM) and transferred to the Device Geo-Location Collector;

The SABA Analysis and Extrapolation System is described in FIG. 7.

SABA Analysis and Extrapolation System (AES) (700) is the kernel of SABA System. The AES is the module that stores, retrieves, manipulates, and executes Functional and Extrapolation rules (701) on TADR (705), PADO (706), and Geo-location data (711) to define if the requester (using Requester ID (714)) is who he claims to be. To do so, the AES will use:
all the owner's and delegates' information stored in PADO,
all the requester's information stored in TADR,
the owner and delegate Geo-location based on its activity and/or on its devices, calculated by the SABA Geo-location Systems (715).

PADO Data Stream Processor (713) is a module building the owner and delegate profiles, based on information collected by SABA Collector agents and sent by the SABA LEM, Geo-location information based on data collected from SABA Geo-location system (715) or data filled by the owner directly through the Management and Configuration Web Site (MCWS).

PADO (706) is a Data Store that contains all verified information available about an owner and delegates. The PADO contains:
User usages (707) made of:
Work usages (708)
Device usages (709),
Application Usages (710),
User Geo-location defined from activity and devices (711).

TADR Data Stream Processor (712) is a module building the requester profile, based on information collected by SABA Theoretical Identity Retriever Agents, sent by the SABA LEM and stored in the TADR Data Set (705).

SABA Type Analysis Processor (702), depending on the type of information, provides TADR data set to Functional & Extrapolation Rules Processors (701). Depending on the result, this module requests the Alerting System (704) to send Alerts.

Functional & Extrapolation Rules Processor (701) executes different rules to compare TADR data set to:

(i) the monitored user profile, stored in the PADO data store (706), the Personal Authentication Data for Owner geo-location (711) retrieved from PADO geo-location agents (703).

Figure 8:
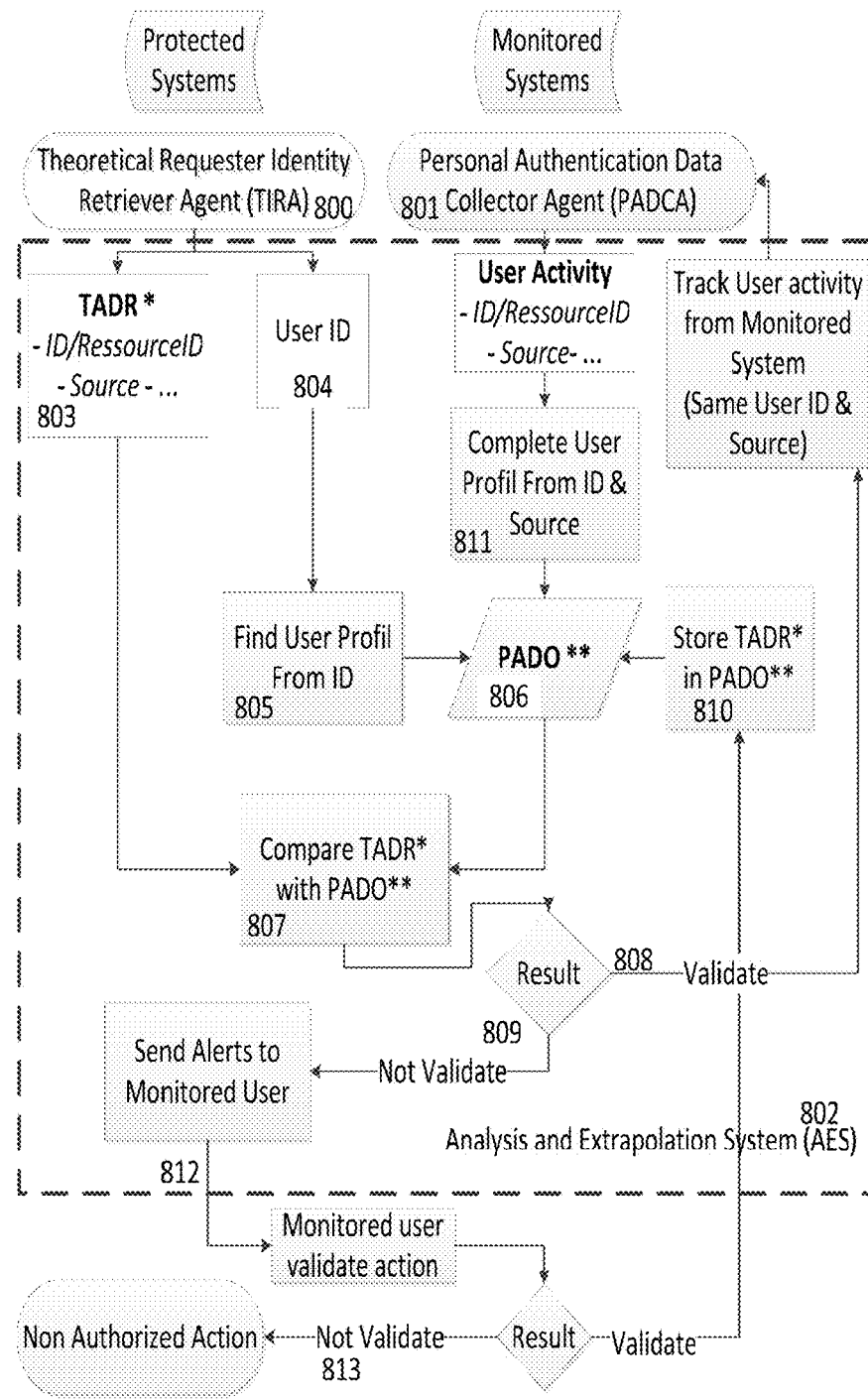
FIG. 8 describes Generic SABA identity check process (mailbox or login)

FIG. 8 describes The Identity Check Process. The Generic SABA process used to protect monitored systems, to collect data, to define a user profile, and to alert the owner when there is a non-authorized action. After the agents are installed on the protected systems, SABA starts to receive data. The data is collected by the Theoretical Identity Retriever Agent (TIRA) (800) and the Personal Authentication Data Collector Agent (PADCA) (801).

When a user makes a new action on a protected system, the TIRA (800) collects information including ID, ResourceID, Source, Application, Version, etc. and sends it to the TADR (803) data store. When received by the system this information is not validated. At this point, we call it Theoretical Authentication Data Request (TADR) (803). To qualify this data and to know if the requester is the owner, a delegate, or a thief, the Secondary Asynchronous Background Authentication will proceed as follow:

All the data got from the TIRA is defined as Theoretical Authentication Data Request (TADR)

User ID or ResourceID (804) is used to find a user profile (805) in the PADO data Store (806)

Then, the system compares owner and delegate profiles found in PADO data Store with the Requester profile in the TADR (807) data store.

If the comparison result between the requester profile and the owner or delegate profile matches: (808):

The system stores the data collected from the Requester Profile to update the owner or delegate profile in the PADO data Store (810).

The system updates directly in the PADO data store (811) the owner or delegate profile with all data tracked (same ID and same source) related to the owner or delegate activity and received from PADCA (801).

If the comparison result between the requester profile and an owner or delegate profile doesn't match: (809):

The system sends an alert to the owner (812)

If the owner validates in the system that he is the initiator of the action the system stores the data collected from the requester profile to update the owner profile in the PADO data Store (810) and updates directly in the PADO data store (811) the owner profile with all data tracked (same ID and same source) related to the owner activity and received from PADCA (801).

If the owner is informed that his data have been compromised and can take all necessary actions quickly (813).

Figure 9:
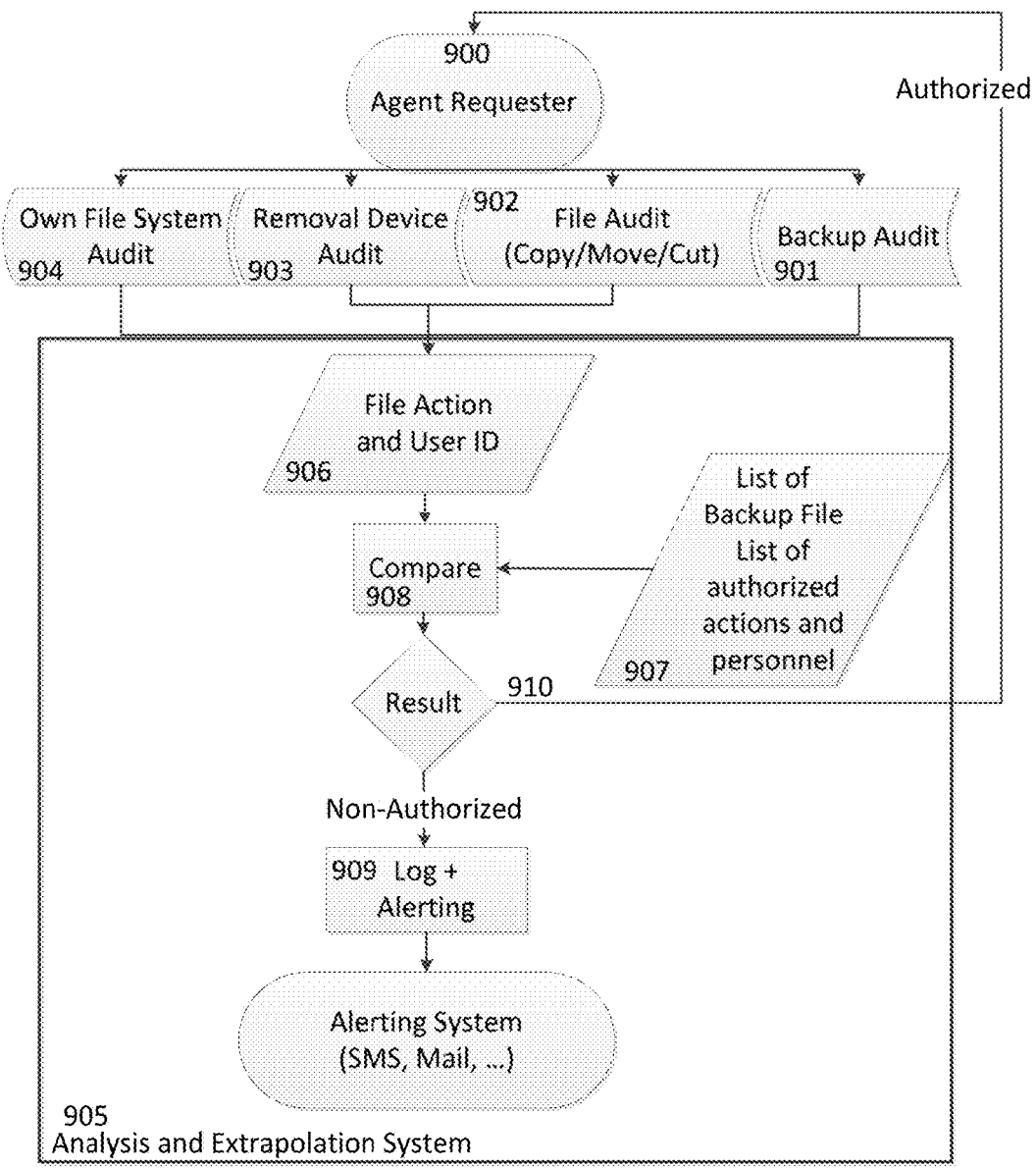
FIG. 9 describes SABA Backup Protection process.
Figure 10:
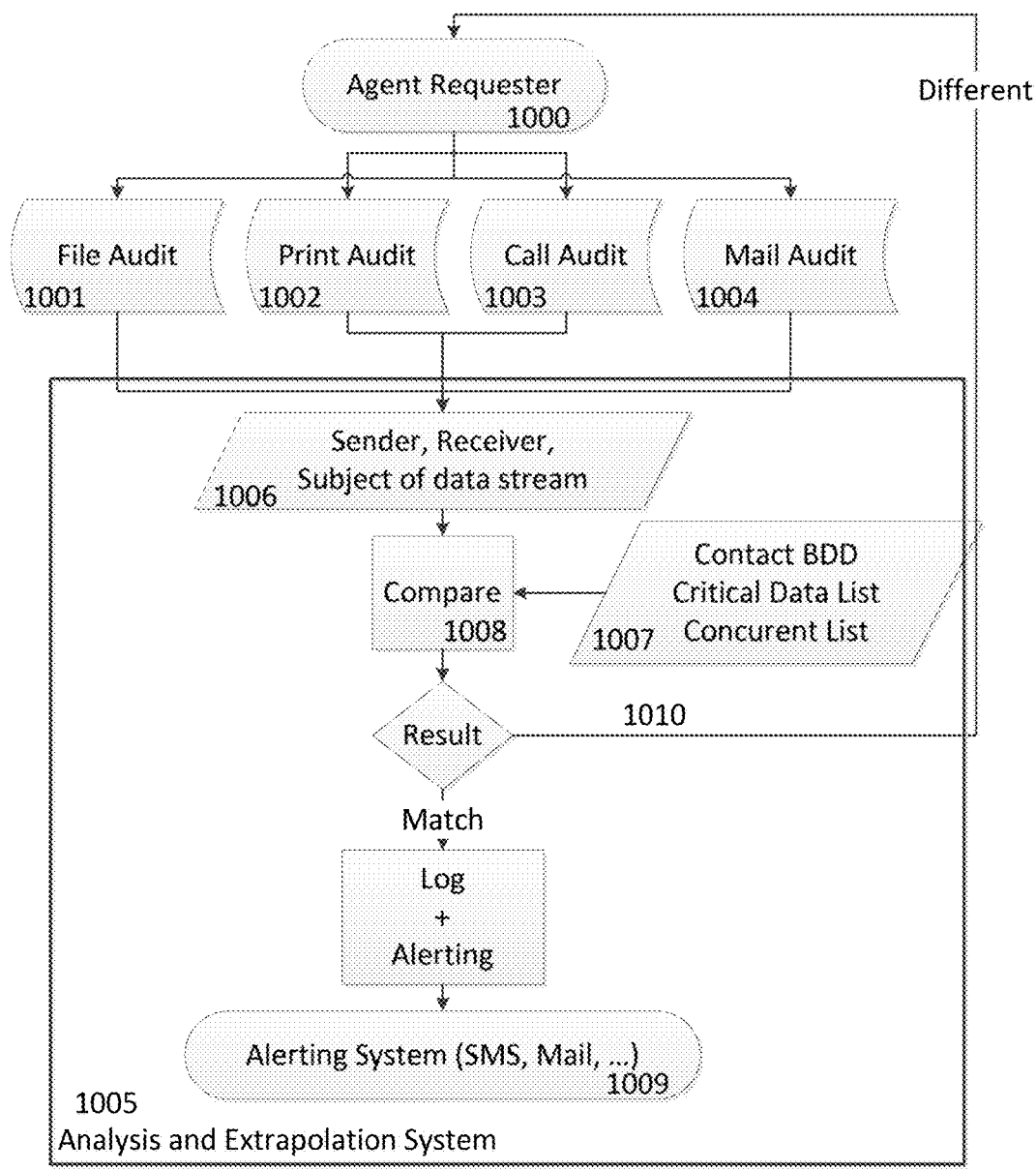
FIG. 10 describes SABA Data Leak Protection process.

The Backup Protection process, as described in FIG. 9, is based on different agents (900) installed on protected systems. These agents are used to collect data from logging systems (e.g., File audit in Microsoft Windows Server, Unix file server, etc.) (901), Backup software (e.g., Tivoli, NetBackup, etc.) (902), or specific applications (e.g., security application to log usage of removal devices like USB keys or disks insight the company) (903) and to protect the place where backup files are stored with a homemade file system (904).

The Analysis and Extrapolation System (AES) (905) aggregates all data to define what action is taken on a backup file and who is doing it (906).

A list of authorized personnel and backup files as well as the configuration of backup software is defined by the IT System administrator (907). Depending on the backup software used in the company, this list can be updated automatically or not.

The AES compares all data collected from the agents with the predefined list (908). If the result identifies a non-authorized action or user, everything is logged and an alert is sent to the designated person (head of security for example (909)) to warn him and provide him maximum information. He can then investigate to identify if there is a thief or a problem in his system. Otherwise, the system keeps on monitoring the backup files (910).

Data Leak Protection Process:

The Data Leak process is based on different agents (1000) installed on the protected systems. These agents are used to collect data from File Servers (e.g., File audit in Microsoft Windows Server, Unix file server, etc. . . . ) (1001), Print Server (e.g., Print Server in Microsoft Windows Server, LPD in Linux Server, etc.) (1002), Mailbox Servers (e.g., Microsoft Exchange, Postfix, Zimbra, Sendmail, etc.) (1004) or PBX/IP PBX (e.g., Asterisk, OmniPBX, etc.) (1003).

All data received from these agents by the Analysis and Extrapolation System (AES) (1005) is used to define what files are read, printed, or sent, who is doing the action, who is called, and what type of subjects define the mail exchange (1006).

A secure web server, based in the AES, lets a designated person (CIO of the company for example) specify what is critical information (ex: confidential documents, secret project, restructuring plan, etc.) or competitors or people who can have access to this information. This generates a list of subjects, contacts and authorized users (1007).

AES compares all data collected from the agents with the defined list (1008). If the result identifies that a confidential document is printed, a mail exchange contains a critical subject, competitors are called, or secret files are accessed by non-authorized users, data is logged and an alert is sent to a designated person (for example, CIO (1009)) to warn him and provide him the maximum information. He can then investigate to identify if there is a thief or a problem in his company. The system continues monitoring data leak attempts (1010).

Embodiment 1: Collector Agents

According to this embodiment agents are software code. According to a preferred embodiment, agents are software programs that can read and extract technical data (logs) generated by hardware, systems, or installed software in an IT environment. Network equipment, Servers, Computers, operating systems, database management systems, mail systems, web site, or ERP and CRM software, are components of an IT infrastructure that create logs. This information is technical data relative to efficiency, realized actions or detected problems on a system.

There are 3 types of collector agents:
i. Monitoring of protected systems
ii. Collecting of owner's and delegates' actions
iii. Collecting of owner's and delegates' device position The same agent can be from different types and provided all the information detailed above.

Collector Agents for Monitoring Protected Systems:

Those agents are developed to provide all connections and all attempt of access to systems defined as critical. A critical system is an environment that is monitored and protected by the SABA system. They can be computers, servers, networks, mail or database systems, programs or web sites. Agents receive all connection logs and send them to an extraction module. Then the data are transferred to the Collector Engine to be sorted and stored in the TADR Dataset to be processed by the Analysis and Extrapolation Systems that use complex rules and algorithms to determine whether or not it was accessed by an authorized user.

Collector Agents for Collecting Owner's and Delegates' Actions:

These agents are developed to provide all actions made by the owner and delegates on a monitored system. This data is developed in house to insure that the information is surely and safely retrieved from the systems and to ensure owner and delegate identity. Agents receive all of the owner's and delegates logs and sends them to an extraction module. Then this data is transferred to the Collector Engine to be sorted and stored in the PADO Dataset before to be compare with TADR data by the Analysis and Extrapolation Systems.

Collector Agents for Collecting Owner's and Delegates' Devices Positions:

These agents are developed to provide the positions of the owner's and delegates' devices. This data is developed in house to insure that the information is surely and safely retrieved from monitored devices and to ensure owner and delegate identity. Agents receive all of the owner's and delegates' positions and send them to an extraction module. Then this data is transferred to the Collector Engine to be sorted and stored in the PADO Dataset before being compared by the Analysis and Extrapolation Systems, with the pre calculated position of data issued from TADR dataset.

EXAMPLE 1

On an Exchange 2010 SP1 Mail System, the collector agent is able to read systems logs and to obtain more information than those provided natively. The technical data is collected from the system and transferred to an extractor module.

Embodiment 2: Data Extractor Module

Data Extractor Modules are used to collect all technical data provided by collector agents and to transfer it to the Collector Engine in the Central Server Management (CSM). These modules can be installed in the user's IT environment or on the user's device.

There are 2 types of extractor modules:
a. Local Extractor Module (LEM)
b. Geo-location Extractor Module (GEM)

One Extractor module can be from different types depending on the place where it is installed.

Local Extractor Module:

The Local Extractor Module is used to collect all technical data about actions and connections provided by the collector agents in the IT user's environment. Then the collected data is transferred to the Collector Engine in the CSM to be processed. LEM can be associated with the collector agent in the same installed program depending of the user's options and depending of the size of user's IT environment.

Geo-location Extractor Module:

The Geo-location Extractor Module is used to collect all position data provided by the collector agents installed on the user's device or information from related events generated by the user's activity. The collected data are then transferred to the Collector Engine in the CSM to be processed. GEM can be associated with a collector agent in the same installed program depending of the user's options and depending of the size of user's IT environment.

EXAMPLE 2

In a user's IT environment, from PBX collector agent, the system can deduce if the monitored user is using his phone in his office; from Computer tracking Collector Agent, the system can know that the monitored user is in his office using his computer and retrieve his position; from Presence Collector Agent, the system gets immediately the present status and so his location; from calendar collector agent, the system can know his agenda and location; and from Payment Collector Agents, the system know the place where the transaction is made and deduce monitored user position.

On an Iphone, the installed application comprises a data position collector agent that obtains geo-position provided by the smartphone GPS or GSM triangulation and a GEM to transfer this information to the Central Server Management to be geocoded and processed by the Analysis and Extrapolation System Embodiment 3: Collector Engine Collector Engine is the first step of data processing in the Central Server Manager. It is used to define and sort the data received from the extractor modules. If data corresponds to new connections or actions on a protected system, information is transferred to TADR Data Stream Processor and stored in the TADR dataset. If data corresponds to actions realized by an owner on a monitored environment, information is transferred to PADO Data Stream Processor and stored in the PADO dataset. If the data corresponds to position and geo-location of user's device, information is transferred to Geo-location System and stored in PADO after being geocoded.

EXAMPLE 3

All collected data is sent to the Central Server Management without being identified before. The Collector Engine works like a switch that identifies the type of data and that transferred it to the dedicated processor.

Embodiment 4: Analysis and Extrapolation System

Analysis and Extrapolation System (AES) is the kernel of SABA System. The AES is the module that stores, retrieves, manipulates, executes functional and extrapolation rules and comparison on TADR data, PADO data and Geo-location data to define if the requester is the one he claims to be. Each owner has specific rules and profiles, based on information collected by Collector agents and sent by the extractor or data filled by the owner directly through the Management and Configuration Web Site, and stored in PADO dataset. Analysis and Extrapolation System use this information and compare it with the Request event received from TADR Data Stream to define if the requester is the owner. Rules are Boolean expressions divided in 2 types, Grant rules or Deny rules. When one of Grant Boolean Expressions result is equal to zero, or when one of Deny Boolean Expressions is superior to zero, an alert is generated and transferred to the Alerting System.

EXAMPLE 4

TADR Data processor gets information about a new connection on the mailbox of the CEO of the company. This connection is a web access connection at 1 AM during working days.

Rules that defines CEO of company say that he never uses web access connection, so the Boolean expression of this deny rules is superior to zero (web access is forbidden), an alert is generated.

Profiles stored in the CEO's PADO dataset say that CEO of the company uses Web access every night to read his email messages, so the Boolean expression of the Grant rules is different of zero (at less one action is defined as granted), there is no alert generated, the protected system is used normally.

Embodiment 5: Alerting System

The Alerting System is used to manage all alerts. First it analyzes the alert generated by the Analysis and Extrapolation System and defines if the same alert was generated before. If the same alert exists, it looks about its status (Open, Close) and runs associated action. In the case of a same opened alert, Alerting System extends existing alert with the new one, without sending alert to the owner. In the case of a same closed alert or if there was no alert, Alerting System sends to the right owner using the preferred method of alert (SMS, email, call, etc.), and tags it in an opened alert status.

EXAMPLE 5

A new web access connection from Paris is identified on a protected system and Analysis and Extrapolation System defines that this connection was not made by the owner, an alert is generated.

- The same connection was identified two hours before, Alerting System sent an alert to the owner and left the alert in open status. Now the Alerting System doesn't generate a new alert, it extends the old alert with the new one.
- There was never web access connection from Paris before, Alerting System sends an alert to the owner to inform him of a potential threat on his mailbox and stores this alert in open status.

Combined Embodiment: SABA System

When all Embodiments are associated, the SABA System is able to receive technical data from owner's environment and to determine whether the last access on his protected system was a threat or not. If the threat is real, an alert is sent to the owner.

What is claimed is:

1. A method for monitoring confidentiality of a user's emails, files and other data by monitoring and evaluating access to said user's emails, files and other data compromising the steps of:
   a. collecting technical data from said user's information technology environment, and send said technical data to a central system management (CSM), wherein said technical data contains actions performed by a requester that is accessing said user's e-mails, files or other data;
   b. collecting geo-location data from said user's devices, and send said geo-location data to said CSM;
   c. receiving and storing, by said CSM, said technical data in a theoretical authentication data requester (TADR) dataset;
   d. receiving authenticated technical data from information technology environment and device of said user and storing said authenticated technical data in a personal authentication data of owner (PADO) dataset;
   e. applying one or more tests based on different rules to identify and to validate the TADR dataset;
   f. analyzing said geo-location data, by said CSM, and applying one or more comparisons between said PADO dataset and the TADR dataset to determine if said requester is said user;
   g. generating and sending alerts to a predefined contact when said requester is determined, based on said comparison, to not be said user or a person specifically designated by said user to view said user's emails, files and other data; and
   h. updating said PADO dataset when said requester is determined, based on said comparison, to be said user;
   wherein said PADO dataset comprises:
      said user's work usages,
      said user's device usages,
      said user's application usages, and
      said user's geo-location usages.

2. The method of claim 1, wherein the collected technical data from the user's information technology environment comprises standardized text file format from any log systems including, but not limited to, date, time, userID, client IP address, requested application, user action, and access method.

3. The method of claim 1, wherein the collected technical data from the user's devices comprises a global positioning system (GPS) exchange format in an extensible markup language (XML) schema including latitude, longitude, altitude, horizontal accuracy, vertical accuracy, speed, and course data.

4. The method of claim 1, wherein the TADR dataset comprises a standardized extensible markup language (XML) format including new connection and new action on protected environments.

5. The method of claim 1, wherein the PADO dataset comprises a standardized extensible markup language (XML) format including actions from established connections on protected environments.

* * * * *